United States Patent
Yen et al.

(10) Patent No.: US 6,477,652 B1
(45) Date of Patent: Nov. 5, 2002

(54) CRYPTOGRAPHIC CHECKSUM APPARATUS

(75) Inventors: Sung-Ming Yen, Taipei (TW); Pao-Yu Kuo, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 09/293,805

(22) Filed: Apr. 19, 1999

(51) Int. Cl.$^7$ ................................................. G06F 1/24
(52) U.S. Cl. ........................ 713/200; 713/201; 713/193
(58) Field of Search .................. 713/153, 168, 713/189–193, 200, 201

(56) References Cited

U.S. PATENT DOCUMENTS 5,970,143 A * 10/1999 Schneier et al. ............. 380/251
6,324,650 B1 * 11/2001 Ogilvie ........................ 713/202

* cited by examiner

Primary Examiner—Thomas R. Peeso
(74) Attorney, Agent, or Firm—Pillsbury Winthrop, LLP

(57) ABSTRACT

A cryptographic checksum apparatus is disclosed. This apparatus includes a keystream generator configured to generate a secret keystream according to a common secret key. The apparatus also includes a postfix circuit configured to augment postfix bits after an original message. Further, a demultiplexer is used to direct the postfixed message to one of the output terminals under the control of the secret keystream. A first mixer is connected to one output terminal of the demultiplexer, and a second mixer is connected to the other output terminal of the demultiplexer. Moreover, a first compression circuit is used to receive an output of the first mixer, wherein content of the first compression circuit is used as the first part of the checksum output. Similarly, a second compression circuit is used to receive an output of the second mixer, wherein content of the second compression circuit is used as the second part of the checksum output. Finally, a first transmission gate is connected to the second compression circuit, whose output bit is then transferred to the first mixer through the first transmission gate under control of the postfixed message bit. A second transmission gate is connected to the first compression circuit, whose output bit is then transferred to the second mixer through the second transmission gate under control of the postfixed message bit.

10 Claims, 3 Drawing Sheets

CRYPTOGRAPHIC CHECKSUM APPARATUS

BACKGROUND OF THE INVENTION

1. Field of the Invention

The present invention relates to a cryptographic checksum apparatus, and more particularly, to a cryptographic checksum circuit with conditional cross feedback of feedback shift registers (FSRs).

2. Description of the Prior Art

An article entitled *A Fast Cryptographic Checksum Algorithm Based on Stream Ciphers, Proc. of the AUSCRYPT'92*, December, 1992 by Xuejia Lai et al. discloses a simple and fast cryptographic checksum algorithm based on stream ciphers for the use of message authentication. The generated cryptographic checksum is used to detect active attacks on the communication channel to ensure data integrity. The Lai's algorithm primarily applies conventional keyed-hash function to map variable-length input strings into fixed-length output strings, which are then used as the integrity authenticator.

For a known pair of message and checksum, an attacker can successfully find a valid pair of message and checksum with probability 1/2 by changing the last bit in the message and the last bit in the checksum. By inference, the attacker can also successfully find another valid pair of message and checksum with probability $(1/2)^t$ by changing the last t bits in the message and appropriate modification of the last t bits in the checksum. Accordingly, a postfixed format is generally required to prevent the possible forgery of obtaining valid pair of message and checksum. For practical applications, approximately 100 bits of postfixed format is required to achieve protection probability of $10^{-30}$. Unfortunately, such long length of the postfixed format will inevitably make the message receiving and transmission more complicated. For the foregoing reasons, there is a need for a cryptographic checksum apparatus with low forgery probability and short postfixed format, so that a shared common secret key can be used for a long period of time between a sender and a receiver for the purpose of authenticated communication.

SUMMARY OF THE INVENTION

In accordance with the present invention, a cryptographic checksum apparatus is provided to substantially reduce forgery probability.

Another object of the present invention is to provide a cryptographic circuit with short postfixed format and low forgery probability, so that a shared common secret key can be used for a long period of time between a sender and a receiver for the purpose of authenticated communication.

In one embodiment according to the present invention, the cryptographic checksum circuit includes a keystream generator configured to generate a secret keystream according to a common secret key, wherein the secret keystream includes a string of binary random numbers. The apparatus also includes a postfix circuit configured to augment postfix bits after an original message, thereby generating a postfixed message. Further, a demultiplexer having, for example, two output terminals is used to direct the postfixed message to one of the output terminals under the control of the secret keystream. A first mixer, such as a logic exclusive OR gate, is configured to receive the output of one output terminal of the demultiplexer, and a second mixer is configured to receive the output of the other output terminal of the demultiplexer. Moreover, a first compression circuit is used to receive an output of the first mixer, wherein the content of the first compression circuit is used as the first part of the checksum output. Similarly, a second compression circuit is used to receive an output of the second mixer, wherein the content of the second compression circuit is used as the second part of the checksum output. In the embodiment, the first compression circuit or the second compression circuit includes a shift register and a digital switch connected therebetween, wherein the output of the digital switch is fed to the corresponding compression circuit. Finally, a first transmission gate, such as a logic AND gate, is configured to receive an output bit of the second compression circuit, the output bit of the second compression circuit being then transferred to the first mixer through the first transmission gate under control of the postfixed message bit. A second transmission gate is configured to receive an output bit of the first compression circuit, the output bit of the first compression circuit being then transferred to the second mixer through said second transmission gate under control of the postfixed message bit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
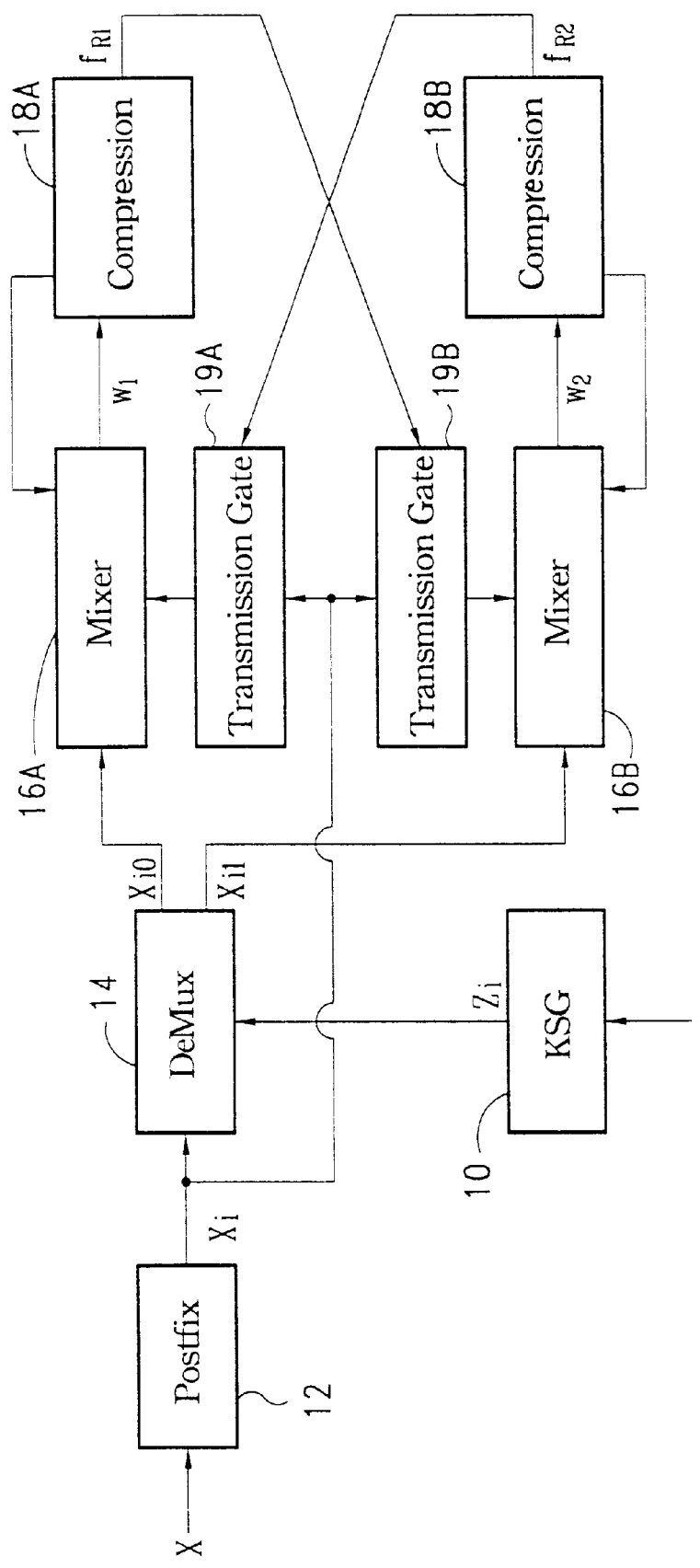
FIG. 1 shows a schematic block diagram of a cryptographic checksum apparatus according to the present invention.

FIG. 1 shows a schematic block diagram of a cryptographic checksum apparatus according to the present invention. A keystream generator (KSG) 10 receives and processes a common secret key K to generate a secret keystream $z^n = z_0, z_1, \ldots, z_i, \ldots, z_{n-1}$. In this embodiment, the keystream generator includes a random number generator, which generates a string of binary random numbers according to the value of the secret key K. Some postfix bits are augmented after an original message x by a postfix circuit 12, thereby generating a message with postfixed format $x^n = x_0, \ldots, x_1, \ldots, x_i, \ldots, x_{n-1}$.

Subsequently, a demultiplexer (DeMux) 14 is used to receive the postfixed message $x_i$ and then produce two separate message strings (i.e., $x_{i0}$ and $x_{i1}$) under the control of the secret keystream $z_i$. Specifically, for example, the postfixed message $x_i$ is transferred to the first terminal $x_{i0}$ when the secret keystream $z_i$ becomes logic low; and, on the other hand, the postfixed message $x_i$ is transferred to the second terminal $x_{i1}$ when the secret keystream $z_i$ becomes logic high. It is appreciated by the skilled artisan that the number of the separate output strings of the demultiplexer 14 is not limited to two as the present embodiment is shown for the purpose of illustration.

The message string $x_{i0}$ and message string $x_{i1}$ then input to a first mixer 16A and a second mixer 16B, respectively.

Next, the output $w_1$ of the first mixer 16A and the output $w_2$ of the second mixer 16B further feed to a first compression circuit 18A and a second compression circuit 18B, respectively. In this embodiment, a feedback shift register (FSR) is used to perform the function of each of the compression circuits 18A and 18B. The output bit $f_{R1}$ of the first compression circuit 18A and the output bit $f_{R2}$ of the second compression circuit 18B are cross fed back to a second transmission gate 19B and a first transmission gate 19A, respectively. The switching status of the transmission gates 19A and 19B is controlled by the postfixed message $x_i$. Specifically, for example, the transmission gates 19B and 19A are closed when the postfixed message $x_i$ becomes logic high, so that the output bits $f_{R1}$ and $f_{R2}$ can be transferred to the second mixer 16B and the first mixer 16A, respectively, via the transmission gates for further processing. According to the configuration of FIG. 1 wherein the output bits $f_{R1}$ and $f_{R2}$ from the compression circuit 18A and 18B are regulated by the transmission gates 19B and 19A before being fed back to the opposite compression circuit, the cross feedbacks of the cryptographic checksum apparatus of FIG. 1 is thus referred to as being conditional. The content of the register in the compression circuit is finally used as the checksum for an authenticated communication, wherein the content of the compression circuit 18A is used as the first part of the checksum output, and the content of the compression circuit 18B is used as the second part of the checksum output.

Figure 2:
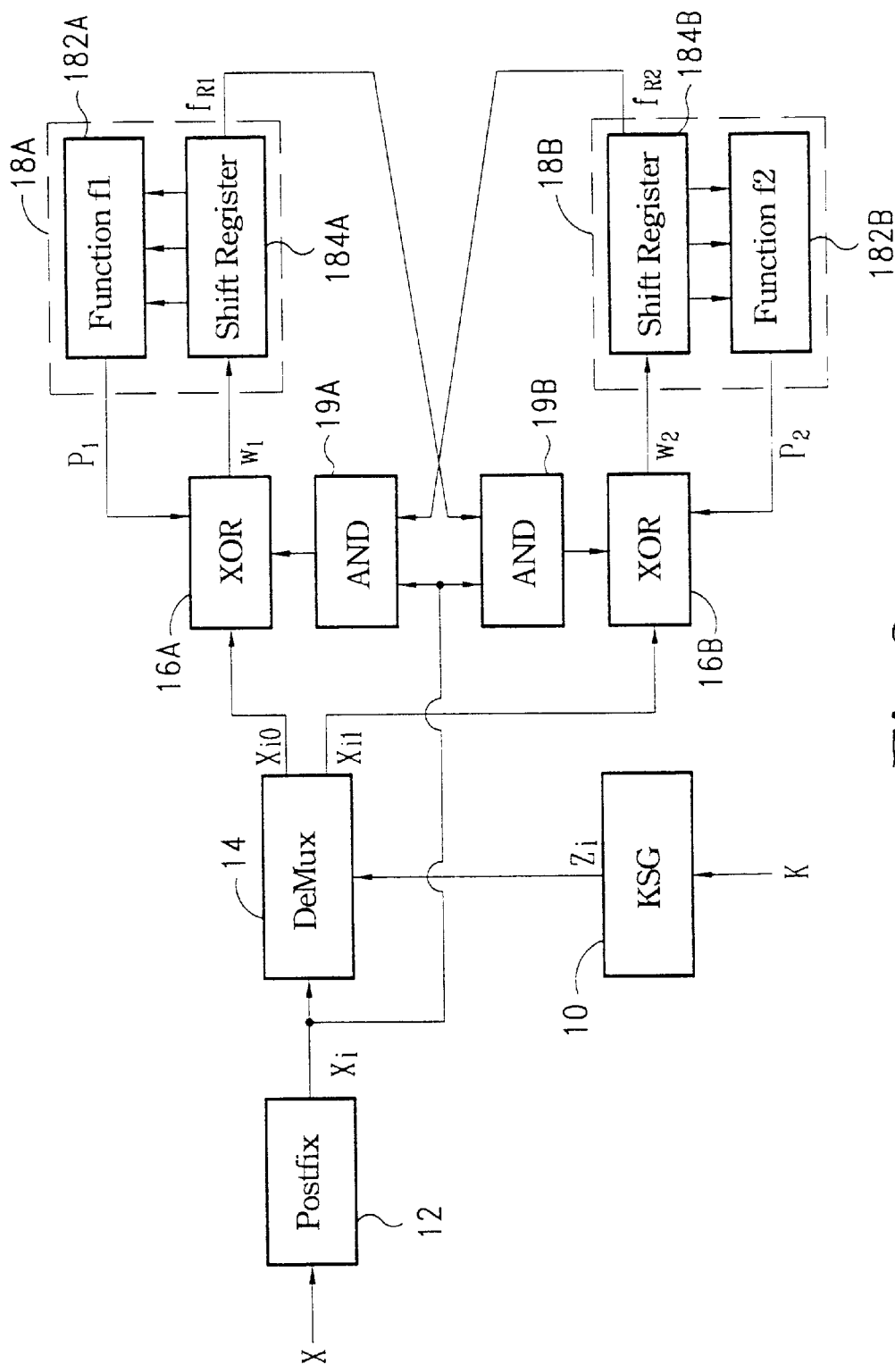
FIG. 2 illustrates a detailed schematic diagram of the cryptographic checksum circuit according to one embodiment of the present invention.
Figure 3:
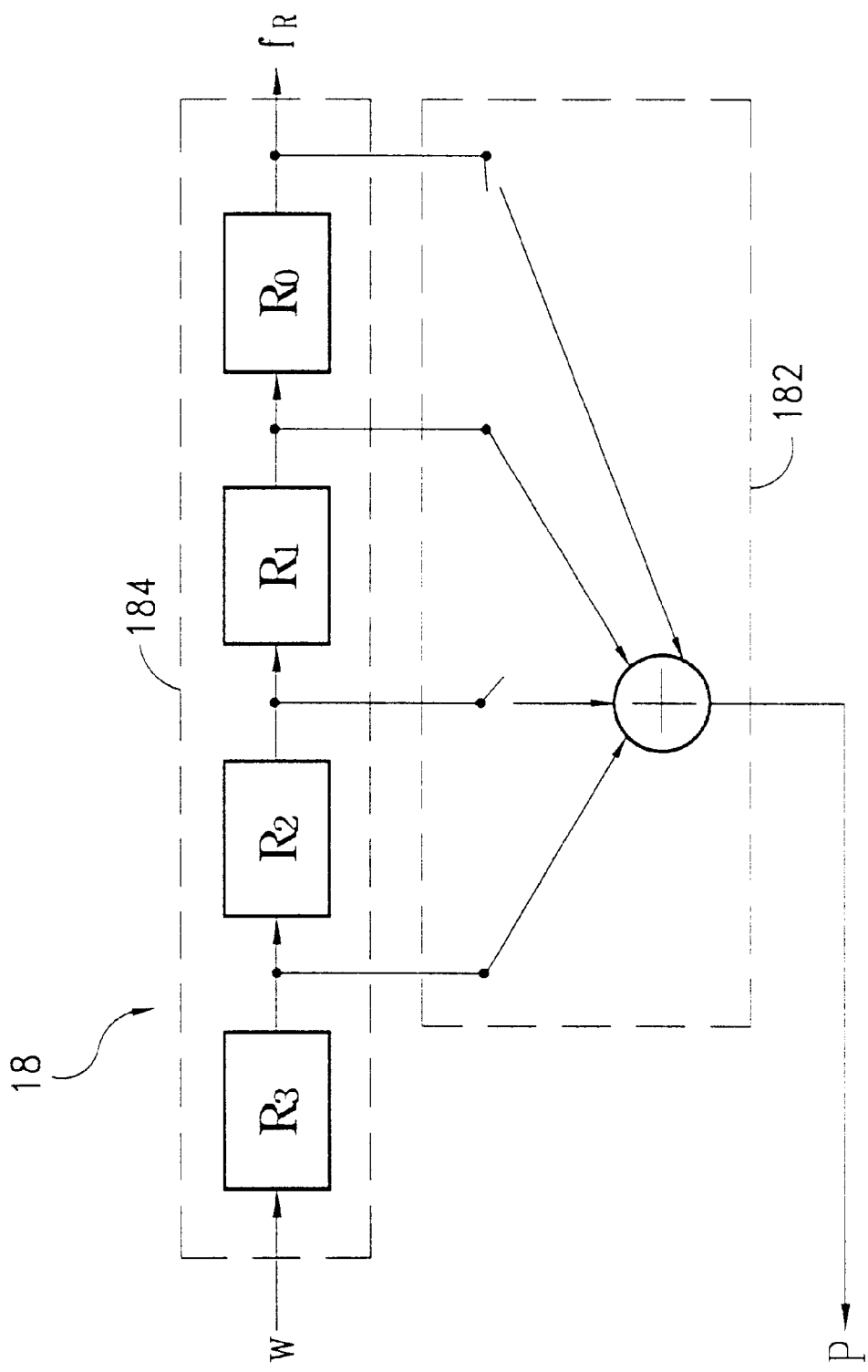
FIG. 3 illustrates a schematic diagram demonstrating one exemplary implementation of the compression circuit in the cryptographic checksum apparatus.

For better understanding the present invention, a detailed schematic diagram of the cryptographic checksum circuit is illustrated in FIG. 2. The portions corresponding to those in FIG. 1 are designated with the same numerical. In this embodiment, each of the mixers 16A and 16B (FIG. 1) is implemented with a conventional logic exclusive OR (XOR) gate. Furthermore, each of the transmission gate 19A and 19B (FIG. 1) is implemented with a standard logic AND gate. The compression circuit 18A or 18B (FIG. 1) includes a function $f_1$ (designated as 182A) or $f_2$ (designated as 182B) and a shift register 184A or 184B. The schematic diagram 18 shown in FIG. 3 illustrates one exemplary implementation of the compression circuit 18A or 18B (FIG. 1), wherein the individual output bits of the shift register 184 are input to a digital switch function 182. The output P of the digital switch 182 is further fed to the XOR gate 16A or 16B as shown in FIG. 2.

The operation of the cryptographic checksum circuit of FIG. 2 is further explained below. When the i-th bit of the secret keystream $z_i$ becomes logic low, the postfixed message xi is transferred to the terminal $x_{i0}$ (that is, $x_{i0}=x_i$) while leaving the output at the other terminal $x_{i1}$ at logic low. Consequently, the output $w_1$ of the exclusive OR gate 16A and the output $w_2$ of the exclusive OR gate 16B can be expressed by the following formula:

$$w_1 = x_i \oplus p_1 \oplus ((f_{R2} \cdot x_i)) \quad (1)$$

$$w_2 = p_2 \oplus (f_{R1} \cdot x_i) \quad (2)$$

According to the formula (1) and (2), truth tables 1 and 2 for the output $w_1$ and $w_2$, respectively, are then illustrated as shown below.

TABLE 1

| $x_i$ | $p_1$ | $f_{R2}$ | Output: $w_1$ |
|---|---|---|---|
| 0 | 0 | 0 | 0 |
| 0 | 0 | 1 | 0 |

TABLE 1-continued

| $x_i$ | $p_1$ | $f_{R2}$ | Output: $w_1$ |
|---|---|---|---|
| 0 | 1 | 0 | 1 |
| 0 | 1 | 1 | 1 |
| 1 | 0 | 0 | 1 |
| 1 | 0 | 1 | 0 |
| 1 | 1 | 0 | 0 |
| 1 | 1 | 1 | 1 |

$w_1 = x_i \oplus p_1 \oplus (f_{R2} \cdot x_i)$

TABLE 2

| $x_i$ | $p_2$ | $f_{R1}$ | Output: $w_2$ |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 1 |
| 1 | 1 | 1 | 0 |

$w_2 = p_2 \oplus (f_{R1} \cdot x_i)$

From the above truth tables, it is evident that when an attacker wants to modify the last message bit, for example $x_i$, into its complementary state, the attacker cannot determine whether to change signal $w_1$ into its complementary or not, even the correct status of $z_i$ has been guessed (the above tables assume $z_i=0$). Similarly, even the attacker finds out that $z_i=0$, he or she still cannot make a definite decision whether he or she must change the signal $w_2$ into its complementary or not. The reason of this uncertainty for the attacker is that all the four previous status of $p_1$, $p_2$, $f_{R1}$, and $f_{R2}$ are unknown to the attacker. Therefore, the attacker can only successfully forge a valid pair of message and checksum with probability 1/4 by changing the last bit $x_{n-1}$ in $x^n$ and the last bits in $w_1$ and $w_2$. By inference, the attacker can only successfully forge a valid pair of message and checksum with probability $(1/4)^t$ by changing the last t bits in $x^n$ and appropriate modification of the last t bits in $w_1$ and $w_2$. For achieving protection probability of $10^{-30}$, only 50 bits of postfixed format is needed for the cryptographic checksum circuit according to the present invention. On the other hand, 100 bits of postfixed format is required in the conventional cryptographic checksum circuit, such as that disclosed by Lai et al. as mentioned above. Furthermore, the cryptographic checksum circuit according to the present invention has lower forgery probability than the conventional circuit with the same length of the postfixed format.

Although the embodiment is illustrated under $z_i=0$, the above cryptanalysis can be applied to the case of $z_i=1$ because the circuit shown in FIG. 1 or 2 is in the form of symmetry. In light of the foregoing disclosure, the cryptographic checksum apparatus has low forgery probability and short postfixed format, and therefore a shared common secret key can be used for a long period of time between a sender and a receiver for the purpose of authenticated communication.

Although specific embodiments have been illustrated and described, it will be obvious to those skilled in the art that various modifications may be made without departing from what is intended to be limited solely by the appended claims.

What is claimed is:

1. A cryptographic checksum circuit, comprising:
a keystream generator configured to generate a secret keystream according to a common secret key, said secret keystream including a string of binary random numbers;
a postfix circuit configured to augment a plurality of postfix bits after an original message, thereby generating a postfixed message;
a demultiplexer having two output terminals, said demultiplexer being configured to direct the postfixed message to one of the output terminals under the control of the secret keystream;
a first mixer configured to receive output of one output terminal of the demultiplexer;
a second mixer configured to receive output of the other output terminal of the demultiplexer;
a first compression circuit configured to receive an output of said first mixer, wherein content of said first compression circuit is used as a first part of a checksum output;
a second compression circuit configured to receive an output of said second mixer, wherein content of said second compression circuit is used as a second part of the checksum output;
a first transmission gate configured to receive an output bit of said second compression circuit, said output bit of the second compression circuit being then transferred to said first mixer through said first transmission gate under control of the postfixed message; and
a second transmission gate configured to receive an output bit of said first compression circuit, said output bit of the first compression circuit being then transferred to said second mixer through said second transmission gate under control of the postfixed message.

2. The cryptographic checksum circuit according to claim 1, wherein each of said first mixer and said second mixer comprises a logic exclusive OR gate.

3. The cryptographic checksum circuit according to claim 1, wherein each of said first compression circuit and said second compression circuit comprises a shift register and a digital switch connected therebetween, wherein an output of the digital switch is fed to one of said first mixer and said second mixer.

4. The cryptographic checksum circuit according to claim 1, wherein each of said first transmission gate and said second transmission gate comprises a logic AND gate.

5. A cryptographic checksum apparatus, comprising:
a keystream generator for generating a secret keystream according to a common secret key;
postfix means for augmenting a plurality of postfix bits after an original message, thereby generating a postfixed message;
a demultiplexer having a plurality of output terminals, said demultiplexer being configured to direct the postfixed message to one of the output terminals under the control of the secret keystream;
a plurality of mixers for individually receiving output of one output terminal of the demultiplexer;
a plurality of compression circuits for individually receiving an output of the corresponding mixer, wherein content of each said compression circuit is used as a checksum output;
a plurality of transmission gates for correspondingly receiving an output bit of the cross-feedback compression circuit, said output bit of the compression circuit being then transferred to the corresponding mixer through the corresponding transmission gate under control of the postfixed message.

6. The cryptographic checksum apparatus according to claim 5, wherein said keystream generator comprises a random number generator, and said secret keystream includes a string of binary random numbers.

7. The cryptographic checksum apparatus according to claim 5, wherein each of said mixers comprises a logic exclusive OR gate.

8. The cryptographic checksum apparatus according to claim 5, wherein each of said compression circuits comprises a shift register and a digital switch connected therebetween, wherein an output of the digital switch is fed to the corresponding mixer.

9. The cryptographic checksum apparatus according to claim 5, wherein each of said transmission gates comprises a logic AND gate.

10. A cryptographic checksum circuit, comprising:
a keystream generator configured to generate a secret keystream according to a common secret key, said secret keystream including a string of binary random numbers;
a postfix circuit configured to augment a plurality of postfix bits after an original message, thereby generating a postfixed message;
a demultiplexer having two output terminals, said demultiplexer being configured to direct the postfixed message to one of the output terminals under the control of the secret keystream;
a first logic exclusive OR gate configured to receive output of one output terminal of the demultiplexer;
a second logic exclusive OR gate configured to receive output of the other output terminal of the demultiplexer;
a first compression circuit configured to receive an output of said first logic exclusive OR gate, wherein content of said first compression circuit is used as a first part of a checksum output, said first compression circuit comprising a first shift register and a first digital switch connected therebetween, wherein an output of the first digital switch is fed to said first logic exclusive OR gate;
a second compression circuit configured to receive an output of said second logic exclusive OR gate, wherein content of said second compression circuit is used as a second part of the checksum output, said second compression circuit comprising a second shift register and a second digital switch connected therebetween, wherein an output of the second digital switch is fed to said second logic exclusive OR gate;
a first logic AND gate configured to receive an output bit of said second compression circuit and the postfixed message, output of said first logic AND gate being connected to said first logic exclusive OR gate; and
a second logic AND gate configured to receive an output bit of said first compression circuit and the postfixed message, output of said second logic AND gate being connected to said second logic exclusive OR gate;
thereby an attacker can only successfully forge the original message and the checksum with probability $(1/4)^t$ by changing last t bits of the postfixed message, the output of said first logic exclusive OR gate, and the output of said second logic exclusive OR gate.

* * * * *